A. HUEGLER.
Tire Tightener.
No. 112,599.   Patented March 14, 1871.
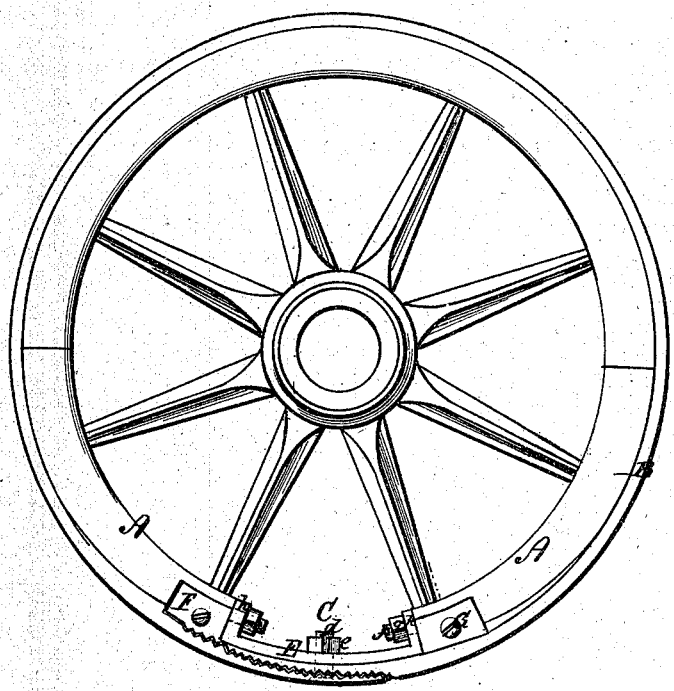
Witnesses:
E. Raettig.
L. S. Mabee
Inventor:
A. Huegler
PER
Attorneys.

UNITED STATES PATENT OFFICE.

ANTHONY HUEGLER, OF SULLIVAN, MISSOURI.

IMPROVEMENT IN SECURING WHEEL-TIRES.

Specification forming part of Letters Patent No. 112,599, dated March 14, 1871.

*To all whom it may concern:*

Be it known that I, ANTHONY HUEGLER, of Sullivan, in the county of Franklin and State of Missouri, have invented a new and useful Improvement in Securing Wheel-Tires; and I do hereby declare that the following is a full, clear, and exact description thereof, which will enable others skilled in the art to make and use the same, reference being had to the accompanying drawing, forming part of this specification.

My invention relates to tires that are cut and serrated on their ends to render them adjustable; and it consists in an improved combination of parts for adjusting and holding them in position.

Figure 1 is a side elevation of my improved wheel, and Fig. 2 is a transverse section through the rim at the lines $x$ $x$ of Fig. 1.

Similar letters of reference indicate corresponding parts.

A represents the wood fellies, which are arranged with a wide gap, C, at one place between them. B represents the tire. It has ends lapping each other at this gap, and gradually tapering flatwise to a point. The lapping surface of each part is serrated, as shown, and a bolt, $d$, and nut $e$ are used to clamp the said ends together, also to a metal felly, E, introduced in the gap C between the wood fellies, and attached to them by the bolts $f$, nuts $g$, and flanges $h$, the latter being on the ends of the felly E.

One of the lapping parts of the tire (preferably the inner one) has a slotted hole for the bolt $e$, to admit of moving the said parts endwise for tightening or loosening the tire.

The tire is preferably thickened at the base of the tapered parts, and a short distance each way therefrom, to strengthen it, to compensate for the weakening due to the serrating and taperings.

F represents corner-plates let into the sides of the wood fellies flush with the surfaces at the corners, and secured by screws G, passing through them and the fellies, as shown, the threaded end screwing into one of the plates, which serves for a nut.

The plates protect the ends of the wood fellies against brooming, bruising, or splitting at the corners by the concussions imparted to the ends by the metal felly and the tire.

The metal felly is introduced mainly to hold the bolt $d$ more securely than the wood fellies will, and to avoid the splitting so liable to the latter when bolts are put through them in this way.

It will be seen that when arranged in this way the tire may be tightened at any time by any person not skilled in the ordinary expensive process of setting tire, and without requiring to be heated.

Having thus described my invention, I claim as new and desire to secure by Letters Patent—

The metal corner-pieces F F, metal felly E, and bolts and nuts $d$ $e$ $f$ $g$ $h$, combined, as described, with the serrated ends of the tire B, for the purpose set forth.

ANTHONY HUEGLER.

Witnesses:
ERNEST A. SOLF,
H. B. CLARK.